United States Patent [19]

Motomatsu et al.

[11] Patent Number: 4,734,456

[45] Date of Patent: Mar. 29, 1988

[54] THERMOPLASTIC RESIN COMPOSITION COMPRISING STYRENIC POLYMER AND OLEFIN/UNSATURATED ACID ANHYDRIDE/UNSATURATED ACID ALKYL ESTER POLYMER

[75] Inventors: Kazuhiko Motomatsu, Hyogo; Mikio Kodama, Osaka; Hiromichi Aoki, Hyogo; Ichiro Sato, Osaka, all of Japan

[73] Assignee: Sumitomo Naugatuck Co., Ltd., Osaka, Japan

[21] Appl. No.: 928,357

[22] Filed: Nov. 10, 1986

[30] Foreign Application Priority Data

Nov. 8, 1985 [JP] Japan ................................. 60-251789

[51] Int. Cl.$^4$ .............................................. C08L 51/00
[52] U.S. Cl. ....................................... 525/74; 525/207
[58] Field of Search ..................... 525/74, 207, 93, 222

[56] References Cited

U.S. PATENT DOCUMENTS 4,619,969 10/1986 Doi et al. ............................... 525/93

Primary Examiner—Theodore E. Pertilla

[57] ABSTRACT

A thermoplastic resin composition having excellent and well balanced physical properites such as chemical resistance, drop weight impact resistance and thermal stability which comprises (A) a styrenic polymer and (B) a ternary polymer comprising 50 to 98.5% by weight of an olefin, 0.5 to 10% by weight of an unsaturated dicarboxylic acid anhydride and 1 to 40% by weight of an unsaturated carboxylic acid alkyl ester, the weight proportion of the styrenic polymer (A) and the ternary polymer (B) being 100:0.5-200.

3 Claims, No Drawings

THERMOPLASTIC RESIN COMPOSITION COMPRISING STYRENIC POLYMER AND OLEFIN/UNSATURATED ACID ANHYDRIDE/UNSATURATED ACID ALKYL ESTER POLYMER

The present invention relates to a thermoplastic resin composition. More particularly, it relates to a thermoplastic resin composition comprising a styrenic polymer (i.e. a polymer comprising units of an aromatic vinyl compound) and a ternary polymer and being excellent in physical properties such as chemical resistance, drop weight impact strength and thermal stability.

Styrenic polymers such as polystyrene and styrene-acrylonitrile copolymer are excellent in mechanical properties, processability, etc. and used in various fields including vehicles and light electric appliances. When rubbery polymers (e.g. polybutadiene, ethylene-propylene copolymer, polyacrylic esters) are incorporated into such styrenic polymers, for instance, by polymerizing the monomeric components (e.g. styrene, acrylonitrile) of the styrenic polymers in the presence of said rubbery polymers, the resulting graft polymers show remarkable enhancement in mechanical properties, particularly impact resistance. In fact, high impact polystyrene (HIPS), acrylonitrile-butadiene rubber-styrene resin (ABS), acrylonitrile-ethylene-propylene rubber-styrene resin (AES), etc. experience practical use.

Said styrenic polymers incorporated with rubbery polymers are, however, not satisfactorily balanced in chemical resistance, impact resistance and thermal stability due to limitations on the effect of graft polymerization. For instance, an increase in the acrylonitrile content in the graft polymers for enhancement of chemical resistance results in decrease in the drop weight impact resistance and simultaneously by-produces copolymers having a large acrylonitrile content so that the heat stability, especially when held in a molding machine, is impairment, and discoloration occurs in the resulting molded products.

Aiming at improvement of styrenic polymers in chemical resistance, impact resistance and thermal stability without impairment of their excellent mechanical properties and processability, an extensive study has been made, and as the result, it has now been found that the incorporation of a certain specific ternary polymer into styrenic polymers can achieve said aim. The present invention is based on the above finding.

According to this invention, there is provided a thermoplastic resin composition excellent and well balanced in chemical resistance, drop weight impact resistance and thermal stability which comprises (A) a styrenic polymer and (B) a ternary polymer comprising about 50 to 98.5% by weight of units of an olefin, about 0.5 to 10% by weight of units of an unsaturated dicarboxylic acid anhydride and about 1 to 40% by weight of units of an unsaturated carboxylic acid alkyl ester.

The styrenic polymer (A) is intended to mean any polymer comprising units of an aromatic vinyl compound and optionally units of at least one other compound copolymerizable therewith. Such polymer may additionally comprise units of at least one rubbery polymer. Thus, the styrenic polymer (A) covers homopolymers of an aromatic vinyl compound, copolymers of an aromatic vinyl compound with one or more of other polymerizable monomeric compounds, graft polymers obtained by polymerization of an aromatic vinyl compound and optionally one or more of other polymerizable monomeric compounds in the presence of a rubbery polymer, mixtures of two or more of them (i.e. homopolymers, copolymers and graft polymers), etc.

Examples of the aromatic vinyl compound are styrene, alpha-methylstyrene, p-methylstyrene, chlorostyrene, etc. Examples of the other monomeric compounds are unsaturated nitriles (e.g. acrylonitrile, methacrylonitrile), unsaturated carboxylic acid alkyl esters (e.g. methyl acrylate, methyl methacrylate, ethyl acrylate, ethyl methacrylate, butyl acrylate, butyl methacrylate), unsaturated carboxylic acids (e.g. acrylic acid, methacrylic acid, maleic acid, citraconic acid), unsaturated dicarboxylic acid anhydrides (e.g. maleic anhydride, citraconic anhydride), maleimides (e.g. maleimide, methylmaleimide, ethylmaleimide, N-phenylmaleimide, O-chloro-N-phenylmaleimide), etc. Thus, examples of said copolymers cover styrene-acrylonitrile copolymer, alpha-methylstyrene-acrylonitrile copolymer, styrene-methyl methacrylate copolymer, alpha-methylstyrene-acrylonitrile-methyl methacrylate copolymer, styrene-maleic anhydride copolymer, styrene-acrylonitrile-maleic anhydride copolymer, styrene-maleimide copolymer, styrene-N-phenyl-maleimide copolymer, styrene-acrylonitrile-N-phenylmaleimide copolymer, etc.

Examples of the rubbery polymers for production of the graft polymers are diene polymers (e.g. polybutadiene, styrene-butadiene copolymer, acrylonitrile-butadiene copolymer), ethylene-propylene polymers (e.g. ethylene-propylene copolymer, ethylene-propylene-non-conjugated diene (e.g. ethylidene-norbornene, dicyclopentadiene) polymer, chlorinated polyethylene, acryl rubbers (e.g. polybutyl acrylate), ethylene-vinyl acetate copolymer, etc. Thus, examples of said graft polymers include diene rubber-styrene polymer (HIPS), acrylonitrile-diene rubber-styrene polymer, methyl methacrylate-diene rubber-styrene polymer (MBS resin), acrylonitrile-ethylene-propylene rubber-styrene polymer (AES resin), acrylonitrile-acryl rubber-styrene polymer (AAS resin), acrylonitrile-chlorinated polyethylene-styrene polymer (ACS resin), styrene-diene rubber-maleic anhydride polymer, etc.

The styrenic polymer (A) may be manufactured by any per se conventional polymerization procedure such as bulk polymerization, solution polymerization, suspension polymerization, emulsion polymerization or the like.

The ternary polymer (B) may be the one comprising about 50 to 98.5% by weight of units of of an olefin, about 0.5 to 10% by weight of units of an unsaturated dicarboxylic acid anhydride and about 1 to 40% by weight of units of an unsaturated carboxylic acid alkyl ester. When the olefin content is less than about 50% by weight, the chemical resistance can be hardly improved. When it is more than about 98.5% by weight, the compatibility with the styrenic polymer (A) is impaired, and the impact resistance is lowered with production of the layer separation in the resulting shaped product.

When the content of the unsaturated dicarboxylic acid anhydride is less than about 0.5% by weight, the compatibility between the styrenic polymer (A) and the ternary polymer (B) is not good, and the drop weight impact resistance is lowered. When it is more than about 10% by weight, the thermal stability and the processability are lowered.

When the content of the unsaturated carboxylic acid alkyl ester is less than about 1% by weight, the compatibility with the styrenic polymer (A) is not good. When it is more than about 40% by weight, the chemical resistance is not sufficiently improved, and the heat resistance, the modulus, etc. are lowered so that the the mechanical properties are not well balanced.

For achievement of excellent chemical resistance, drop weight impact resistance and thermal stability, the ternary polymer (B) preferably comprises about 55 to 96% by weight of the olefin, about 1 to 8% by weight of the unsaturated dicarboxylic acid anhydride and about 3 to 37% by weight of the unsaturated carboxylic acid alkyl ester.

Examples of the olefin are ethylene, propylene, butene-1, 4-methylpentene-1, etc. Among them, ethylene and propylene are preferred. Examples of the unsaturated dicarboxylic acid anhydride are maleic anhydride, citraconic anhydride, aconitic anhydride, etc. Among them, maleic anhydride is favorable. Examples of the unsaturated carboxylic acid alkyl ester are alkyl acrylates (e.g. methyl acrylate, ethyl acrylate, propyl acrylate, butyl acrylate), alkyl methacrylates (e.g. methyl methacrylate, ethyl methacrylate, propyl methacrylate, butyl methacrylate), hydroxyalkyl acrylates (e.g. hydroxymethyl acrylate, hydroxyethyl acrylate, hydroxypropyl acrylate), hydroxyalkyl methacrylates (e.g. hydroxyethyl methacrylate, hydroxypropyl methacrylate), etc. Among them, ethyl acrylate and butyl acrylate are the most preferred.

The ternary polymer (B) may be produced by various procedures, of which a typical one is as follows: an olefin is supplied to the first zone of a cylindrical autoclave equipped with a blade type agitator; a mixture of an olefin, an unsaturated dicarboxylic acid anhydride and an unsaturated carboxylic acid alkyl ester is supplied to the second zone of said autoclave; a radical initiator (e.g. t-butyl 2-ethylperhexanoate) dissolved in a hydrocarbon is added to the third zone of said autoclave; and polymerization is effected under a pressure of 1,000 and 2,000 atm.

The weight proportion of the styrenic polymer (A) and the ternary polymer (B) in the thermoplastic resin composition of the invention is not limitative but is preferred to be about 100:0.5–200 from the viewpoint of the balance of various physical properties such as chemical resistance, impact resistance, thermal stability, modulus and heat resistance.

For preparation of the thermoplastic resin composition of the invention, the styrenic polymer (A) and the ternary polymer (B) may be mixed together by the use of any conventional mixing apparatus such as a Banbury mixer, a single screw extruder or a twin screw extruder. If desired, any conventional additive(s) such as dyestuffs, pigments, antioxidants, plasticizers, antistatic agents, ultraviolet ray absorbers, flame retardant agents, lubricants, metal fibers, glass fibers and carbon fibers may be incorporated into the thermoplastic resin composition.

Practical and presently preferred embodiments of the invention are illustratively shown in the following Examples wherein % and part(s) are by weight unless otherwise indicated.

EXAMPLES 1–17 AND COMPARATIVE EXAMPLES 1–10

(I) the styrenic polymer (A) and the ternary polymer (B) or the olefin polymer as produced below were mixed together in a melt state by the aid of a Bunbary mixer to give thermoplastic resin compositions as shown in Table 1.

(A-1) Styrene-acrylonitrile copolymer.

According to a conventional suspension polymerization procedure, styrene and acrylonitrile were polymerized to give a copolymer comprising 71% of styrene and 29% of acrylonitrile and having an intrinsic viscosity of 0.65 (30° C., dimethylformamide).

(A-2) Styrene-maleic anhydride copolymer.

According to a conventional bulk polymerization procedure, styrene and maleic anhydride were polymerized to give a copolymer comprising 87% of styrene and 13% of maleic anhydride and having an intrinsic viscosity of 0.58 (30° C., dimethylformamide).

(A-3) Styrene-N-phenylmaleimide-acrylonitrile polymer.

According to a conventional emulsion polymerization procedure, styrene, N-phenylmaleimide and acrylonitrile were polymerized to give a copolymer comprising 67% of styrene, 10% of N-phenylmaleimide and 23% of acrylonitrile and having an intrinsic viscosity of 0.63 (30° C., dimethylformamide).

(A-4) Acrylonitrile-diene rubber-styrene polymer.

According to a conventional emulsion polymerization procedure, polybutadiene rubber latex (weight average particle size, 0.43 micron; gel content, 85%; solid content, 50%) (100 parts), styrene (35 parts) and acrylonitrile (15 parts) were graft polymerized to give a copolymer having a rubbery content of about 50%.

(A-5) Acrylonitrile-ethylene-propylene rubber-styrene polymer.

According to a conventional solution polymerization procedure, ethylene-propylene-ethylidenenorbornene copolymer (propylene content, 43%; iodine value, 13) (100 parts), styrene (400 parts) and acrylonitrile (170 parts) were graft polymerized to give a copolymer having a rubbery content of about 15%.

(A-6) Styrene-diene rubber-maleic anhydride polymer.

According to a conventional bulk suspension polymerization procedure, polybutadiene rubber (gel content, 75%) (10 parts), styrene (75 parts) and maleic anhydride (15 parts) were graft polymerized to give a copolymer having a rubbery content of about 10%.

(B-1 and B-2) Ethylene-maleic anhydride-ethyl acrylate terpolymer.

In a cylindrical autoclave equipped with a blade type agitator, a monomeric mixture was polymerized in the presence of t-butyl 2-ethylperhexanoate dissolved in a hydrocarbon at 185° C. under a pressure of 1600 atm to give a terpolymer comprising 60% of ethylene. 4.5% of maleic anhydride and 35.5% of ethyl acrylate (B-1) or 92% of ethylene, 1.5% of maleic anhydride and 6.5% of ethyl acrylate (B-2).

(B-3) Ethylene-maleic anhydride-butyl acrylate terpolymer.

In the same manner as in (B-1 and B-2), there was produced a terpolymer comprising 70% of ethylene, 4% of maleic anhydride and 26% of butyl acrylate.

(b-1 and b-2) Ethylene-maleic anhydride-ethyl acrylate terpolymer.

In the same manner as in (B-1 and B-2), there were produced a terpolymer comprising 45% of ethylene, 5% of maleic anhydride and 50% of ethyl acrylate (b-1) or 96% of ethylene, 3.5% of maleic anhydride and 0.5% of ethyl acrylate (b-2).

(b-3) Maleic anhydride-modified polyethylene.

To powdery polyethylene (100 parts), maleic anhydride (0.5 part) was added, and the resulting mixture was kneaded well at 200° C. by the aid of two rolls for about 3 minutes to give maleic anhydride-modified polyethylene.

(II) The thermoplastic resin compositions thus produced were shaped by the use of a injection molding machine to give test pieces, which were then subjected to various tests for evaluation of the physical properties by the following procedures:

(1) Notched Izod impact strength:

According to ASTM D-256, measurement was made at 23° C. on a test piece of ¼ inch in thickness.

(2) Flexural modulus:

According to ASTM D-790, measurement was made at 23° C. on a test piece of ¼ inch in thickness with a flexural speed of 2.5 mm/min.

(3) Heat distortion temperature:

According to ASTM D-648, measurement was made on a test piece of ¼ inch in thickness without annealing at a load of 18.6 kg/cm².

(4) Critical strain against brake fluid:

A test piece (150×20×3 mm) was prepared by cutting an injection molded plate (150×90×3 mm) of the thermoplastic resin composition, and one edge of the test piece was fixed on a device. Onto one surface of the test piece, brake fluid ("Honda Brake Fluid DOT-3") was applied, and the test piece was allowed to stand for 3 minutes under application of stress thereto so as to turn said surface upward. Then, the distance (Xc) between the maximum deflection point and the crack producing point, the distance (l) between the fixed edge and the maximum deflection point and the maximum deflection amount ($\sigma$) were measured, and the critical strain was calculated according to the following equation:

$$\text{Critical strain (\%)} = \frac{3h \times Xc \times \delta}{2l^3} \times 100$$

h: thickness of test piece, 3 mm
$\sigma$: maximum deflection amount, 30 mm
l: distance between the fixed edge and the maximum deflection point, 100 mm (5) Critical strain against polyvinyl chloride (PVC) sheet:

A test piece was prepared in the same manner as in (4) above, and onto the test piece, a flexible PVC sheet (150×20×2 mm) comprising PVC (100 parts; polymerization degree, 700) and dioctyl phthalate (70 parts) was placed and combined with an adhesive tape. The thus prepared test piece was fixed in a device and allowed to stand for 9 days. Thereafter, the critical strain against the PVC sheet was measured in the same manner as in 4).

(6) Drop weight impact strength:

According to the DuPont's impact test, the drop weight impact strength was measured on a test piece (150×90×30 mm) in a room adjusted to 23° C.

(7) Thermal stability:

The thermoplastic resin composition was retained in a cylinder at a resin temperature of 260° C. for 10 minutes and subjected to injection molding to make a test plate (150×90×3 mm). Separately, a test plate of the same shape was prepared by charging the thermoplastic resin composition of the same temperature in a cylinder and subjecting to injection molding in a one minute cycle (injection, 15 minutes; cooling, 30 seconds; takeout and clamping, 15 seconds). The yellowness (YI value) of the test plates was measured and the difference in yellowness ($\Delta$YI) was calculated.

The physical characteristics of the thermoplastic resin composition thus determined are shown in Table 1.

TABLE 1

| | Composition (part(s) by weight) | | Physical property | | | | | | |
|---|---|---|---|---|---|---|---|---|---|
| | Styrenic polymer | Ternary polymer | Notched Izod impact | Flexural modulus | Heat distortion temperature | Critical strain (%) | | Drop weight impact strength | Thermal stability |
| Example | (A) (part(s)) | (B) (part(s)) | strength (kg · cm/cm) | (kg/cm²) | (°C.) | Brake fluid | PVC sheet | (kg · cm) | ($\Delta$YI) |
| Example 1 | A-1: 100 | B-1: 5 | 5.9 | 29200 | 88.0 | 0.31 | 0.64 | 140 | 6.4 |
| Comparative 1 | A-1: 100 | b-1: 5 | 6.5 | 26700 | 84.4 | 0.21 | 0.53 | 130 | 20.5 |
| Example 2 | A-1: 100 | B-2: 50 | 36.5 | 15900 | 83.4 | 0.72 | 1.06 | 990 | 4.2 |
| Example 3 | A-2: 100 | B-2: 10 | 6.6 | 26200 | 106.3 | 0.30 | 0.65 | 200 | 3.9 |
| Example 4 | A-2: 100 | B-2: 40 | 34.7 | 17200 | 101.5 | 0.59 | 0.94 | 640 | 3.9 |
| Comparative 2 | A-2: 100 | b-2: 40 | 13.9 | 18400 | 103.2 | 0.38 | 0.73 | 320 | 5.0 |
| Example 5 | A-3: 100 | B-1: 20 | 16.6 | 22100 | 97.3 | 0.49 | 0.84 | 440 | 6.7 |
| Comparative 3 | A-3: 100 | b-1: 20 | 18.3 | 18200 | 87.3 | 0.12 | 0.46 | 350 | 22.9 |
| Example 6 | A-3: 100 | B-3: 100 | 38.7 | 10400 | 88.5 | 0.97 | 1.33 | >1040 | 5.6 |
| Example 7 | A-4/A-1 = 30/70 | B-1: 100 | 43.5 | 8400 | 77.0 | 1.05 | 1.31 | >1040 | 8.1 |
| Example 8 | A-4/A-1 = 30/70 | B-2: 10 | 23.4 | 19700 | 82.8 | 0.45 | 0.70 | 490 | 3.5 |
| Example 9 | A-4/A-2 = 30/70 | B-1: 30 | 37.8 | 15300 | 98.1 | 0.50 | 0.85 | 640 | 7.2 |
| Example 10 | A-4/A-3 = 30/70 | B-1: 5 | 19.8 | 21300 | 94.9 | 0.42 | 0.81 | 320 | 6.6 |
| Example 11 | A-4/A-3 = 30/70 | B-3: 20 | 29.2 | 17100 | 91.4 | 0.60 | 0.99 | 620 | 5.1 |
| Comparative 4 | A-4/A-1 = 30/70 | b-1: 100 | 47.9 | 3400 | 55.0 | 0.15 | 0.38 | >1040 | 25.8 |
| Comparative 5 | A-4/A-3 = 30/70 | b-3: 10 | 15.7 | 20400 | 83.7 | 0.41 | 0.56 | 290 | 65.1 |
| Comparative 6 | A-4/A-3 = 30/70 | b-2: 5 | 13.5 | 22800 | 96.6 | 0.39 | 0.78 | 160 | 4.9 |
| Example 12 | A-5/A-1 = 80/20 | B-1: 50 | 58.1 | 14300 | 81.8 | 0.72 | 1.09 | >1040 | 7.5 |
| Example 13 | A-5/A-1 = 80/20 | B-2: 10 | 44.5 | 22000 | 86.0 | 0.39 | 0.74 | 460 | 2.5 |
| Example 14 | A-5/A-3 = 80/20 | B-3: 40 | 33.4 | 15600 | 83.9 | 0.71 | 1.15 | 880 | 5.6 |
| Comparative 7 | A-5/A-1 = 80/20 | b-2: 50 | 11.4 | 15000 | 83.0 | 0.48 | 0.85 | 630 | 5.0 |
| Comparative 8 | A-5/A-1 = 80/20 | b-3: 10 | 8.3 | 22800 | 86.9 | 0.31 | 0.67 | 250 | 63.7 |
| Example 15 | A-6: 100 | B-1: 100 | 45.0 | 6400 | 95.3 | 0.89 | 1.26 | >1040 | 8.3 |
| Example 16 | A-6/A-1 = 80/20 | B-2: 50 | 40.4 | 9500 | 96.4 | 0.65 | 1.00 | 790 | 4.5 |
| Example 17 | A-6/A-1 = 80/20 | B-3: 5 | 11.8 | 18500 | 102.0 | 0.24 | 0.59 | 200 | 5.0 |
| Comparative 9 | A-6: 100 | b-1: 100 | 49.5 | 3000 | 72.8 | 0.10 | 0.44 | >1040 | 36.8 |

TABLE 1-continued

| | Composition (part(s) by weight) | | Physical property | | | | | | |
|---|---|---|---|---|---|---|---|---|---|
| | Styrenic polymer | Ternary polymer | Notched Izod impact | Flexural modulus | Heat distortion | Critical strain (%) | | Drop weight impact strength | Thermal stability |
| Example | (A) (part(s)) | (B) (part(s)) | strength (kg · cm/cm) | (kg/cm$^2$) | temperature (°C.) | Brake fluid | PVC sheet | (kg · cm) | ($\Delta$YI) |
| Comparative 10 | A-6/A-1 = 80/20 | b-3: 5 | 5.9 | 20300 | 103.4 | 0.22 | 0.47 | 120 | 44.5 |

What is claimed is:

1. A thermoplastic resin composition which consists essentially of
   (A) a styrenic polymer, and
   (B) a ternary polymer comprising 50 to 98.5% by weight of an olefin, 0.5 to 10% by weight of an unsaturated dicarboxylic acid anhydride and 1 to 40% by weight of an unsaturated carboxylic acid alkyl ester,
   the weight proportion of (A):(B) being 100:0.5–200.

2. The thermoplastic resin composition according to claim 1, wherein the styrenic polymer (A) is a graft polymer of (1) a first component selected from the group consisting of (a) an aromatic vinyl compound and (b) an aromatic vinyl compound and at least one other compound copolymerizable therewith, onto (2) a second component selected from the group consisting of (a) rubbery polymer, (b) rubbery polymer in admixture with a polymer of an aromatic vinyl compound, and (c) rubbery polymer in admixture with a polymer of an aromatic vinyl compound and at least one other compound copolymerizable therewith.

3. The thermoplastic resin composition according to claim 1, wherein the ternary polymer (B) comprises 55 to 96% by weight of at least one of ethylene and propylene, 1 to 8% by weight of maleic anhydride and 3 to 37% by weight of at least one of ethyl acrylate and butyl acrylate.

* * * * *